(12) United States Patent
Drake

(10) Patent No.: US 8,337,094 B2
(45) Date of Patent: Dec. 25, 2012

(54) FIBER OPTIC LIGHT SOURCE ADAPTER

(75) Inventor: Ronald E. Drake, Elbridge, NY (US)

(73) Assignee: Acrolite, Inc., Elbridge, NY (US)

( * ) Notice: Subject to any disclaimer, the term of this patent is extended or adjusted under 35 U.S.C. 154(b) by 299 days.

(21) Appl. No.: 12/896,505

(22) Filed: Oct. 1, 2010

(65) Prior Publication Data

US 2011/0081117 A1    Apr. 7, 2011

Related U.S. Application Data

(60) Provisional application No. 61/247,800, filed on Oct. 1, 2009.

(51) Int. Cl.
*G02B 6/36* (2006.01)
(52) U.S. Cl. .......... 385/78; 385/147
(58) Field of Classification Search ......... 385/76, 385/77, 78, 147
See application file for complete search history.

(56) References Cited

U.S. PATENT DOCUMENTS

| | | | | |
|---|---|---|---|---|
| 5,732,175 A * | 3/1998 | Fan | ................................. | 385/87 |
| 7,021,834 B2 * | 4/2006 | Ohtera | ............................ | 385/88 |
| 7,744,288 B2 * | 6/2010 | Lu et al. | ........................... | 385/60 |
| 8,202,008 B2 * | 6/2012 | Lu et al. | ............................ | 385/53 |
| 2005/0094948 A1 * | 5/2005 | Ohtera | ............................ | 385/92 |
| 2009/0136183 A1 * | 5/2009 | Kahle et al. | .................... | 385/72 |
| 2009/0245736 A1 * | 10/2009 | Ahadian et al. | .................. | 385/92 |
| 2010/0034502 A1 | 2/2010 | Lu et al. | | |
| 2010/0129034 A1 | 5/2010 | Kuffel et al. | | |
| 2010/0183264 A1 | 7/2010 | Lu | | |
| 2011/0002591 A1 * | 1/2011 | Lu et al. | ........................ | 385/135 |
| 2011/0150398 A1 * | 6/2011 | Zimmel et al. | ................... | 385/81 |

* cited by examiner

*Primary Examiner* — Akm Enayet Ullah
(74) *Attorney, Agent, or Firm* — George R. McGuire; Bond Schoeneck & King PLLC

(57) ABSTRACT

A light source adapter to mechanically interconnect a light box and a fiber optic cable. The adapter engages the light box and defines an interior cavity to receive a ferruled fiber optic cable. The exterior surface of the ferrule comprises a circumferential ridge and groove that reversibly interacts with a spring inside the adapter cavity. The spring is biased to require sufficient force to insert or remove the ferrule. The geometry of the circumferential ridge or groove can optionally be modified to increase or decrease the amount of force required to effect insertion or removal of the ferrule inside the cavity.

13 Claims, 4 Drawing Sheets

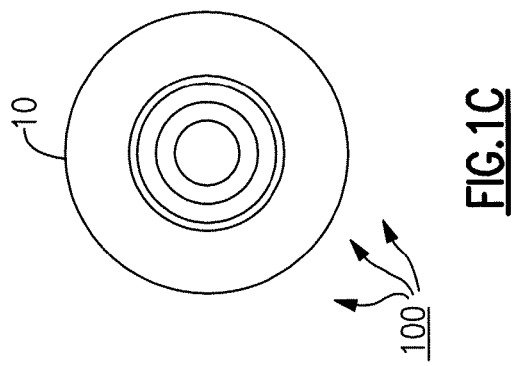
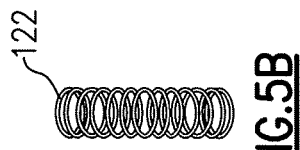
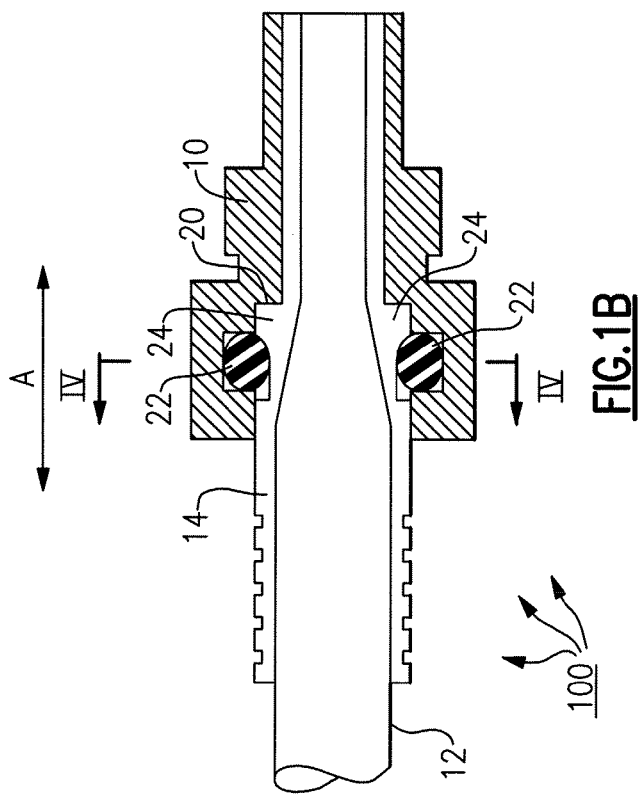
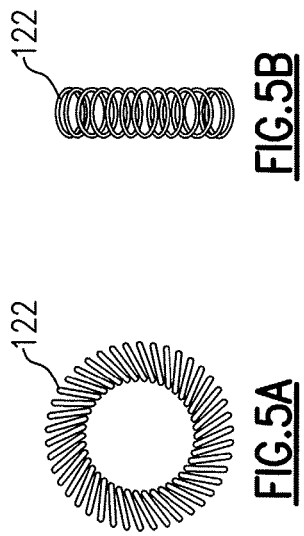
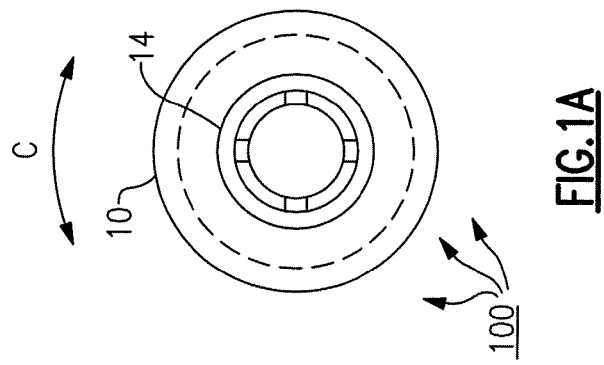

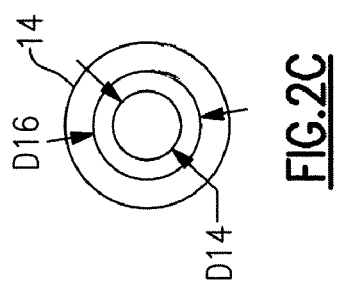
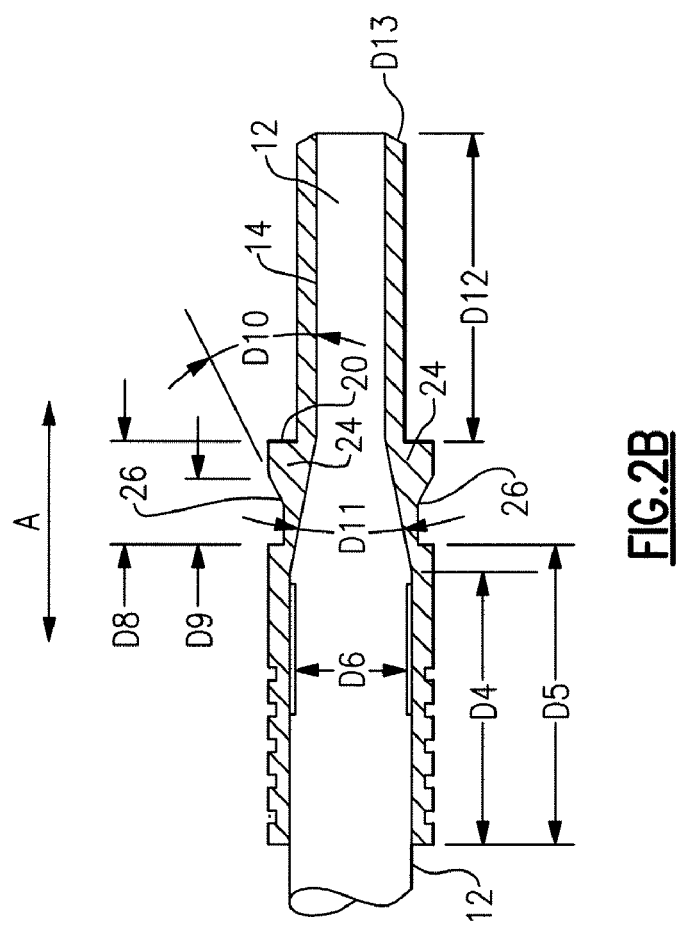
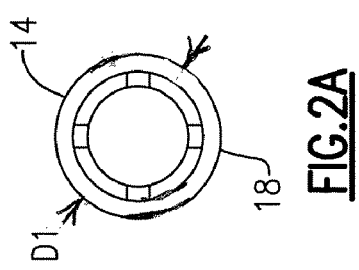

FIBER OPTIC LIGHT SOURCE ADAPTER

The present application claims priority to U.S. provisional patent application No. 61/247,800, filed on 1 Oct. 2009; all of the foregoing patent-related document(s) are hereby incorporated by reference herein in their respective entirety(ies).

BACKGROUND OF THE INVENTION

1. Field of the Invention

The present invention relates to a light source adapter, and more particularly for a coupler adapter for fiber optic line(s), and even more particular to a coupler adapter for mechanically connecting and fiber optic communication connection of a fiber optic ferrule to a light box.

2. Description of the Related Art

Fiber optic fibers, which are used to transmit light, are typically grouped or bundled together in a single ferrule. The ferrule can be reversibly connected to a light source that generates photons and outputs them into the fiber optic fibers. The photons are then transmitted along the length of the fibers until it reaches an output at the distal end. Light output from fiber optic cables is used for a wide variety of useful applications, including communication and entertainment transmissions, medical instruments, and other well-known apparatus in the fiber optics industry. Conventionally, fiber optic ferrules, and the adapters in lightboxes into which the ferrules are plugged, are relatively standardized. That is, any standard ferrule can be plugged into any lightbox.

Since there are a wide variety of applications in the fiber optic industry, there are similarly a wide variety of equipment capable of generating, transmitting, and regulating the flow of photons along fiber optic cables. As a result, there is a demand for adapters for mechanically and optically interconnecting these different types of equipment in an equipment-specific manner.

US patent application ("USPA") 2009/0136183 ("Kahle") discloses a coupler 1 for coupling plug in connectors 2 respectively at the ends of two fiber optic line ferrules 23. The Kahle coupling 1 (reference numerals used in this paragraph refer to the Kahle patent document) includes a coaxially aligned coil spring (no separate reference numeral) and leaf spring 141. The coaxially aligned coil spring provides force in the axial direction, and is therefore not particularly relevant for present purposes. The leaf spring 141 serves to prevent the escape of laser light from coupler 1 when a connector 2, and associated ferrule 23, is plugged into one end of coupler 1, but not the other end of coupler 1. More specifically, the at-rest position of leaf spring 141 is such that it curves across an end opening in the coupler, generally transverse to the axial direction. This blocks the opening and prevents the release of laser light from the empty end of the coupler. As shown by FIGS. 6A to 6C of Kahle, when connector 2, and associated ferrule 23, is inserted into the coupler, the peripheral side 24 of connector 2 flexes leaf spring so that it no longer extends generally transversely across the opening. This means that the newly-inserted ferrule can now optically communicate through the unblocked body of the coupler. When connector 2 is removed, then leaf spring 141 will flex back into its at-rest position, again optically blocking up the opening at the end of coupler 1 until another connector is inserted. It is noted that: (i) Kahle deals with a coupler for coupling two fiber optic lines and not an adapter for connecting a fiber optic line ferrule into a light box; (ii) although the leaf spring of Kahle may exert some force on the connector in the radially-inwards direction, the Kahle leaf spring is not disclosed, and is not believed, to exert radially-inwards directed force on the connector 2 such that it would provide any substantial force resisting insertion and/or pull out of the connector from the coupler; and (iii) Kahle's connector 2 is not disclosed to have any sort of protrusion and/or ridge that comes into any sort of physically interfering contact with leaf spring 141.

USPA 2010/0034502 ("502 Lu") discloses a fiber optic adapter for connecting the connectors respectively located at the ends of two fiber optic ferrules that are to be put into optical communication with each other.

Other publications which may be of interest may include the following: (i) USPA 2010/0183264 (264 Lu"); (ii) USPA 2010/0129034 ("Kuffel"); (iii) USPA 2009/0245736 ("Ahadian"); and/or (iv) U.S. Pat. No. 7,744,288 ("288 Lu").

Description of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

It is therefore a principal object and advantage of the present invention to provide a device that is capable of mechanically interconnecting a light box to a fiber cable. It is a further object and advantage of the present invention to provide a device that provides a controlled amount of mechanical resistance to the insertion and/or pulling out of the ferrule from the adapter. In other words, in at least some preferred embodiments of the present invention, there is a controlled insertion force required to insert the end of the ferrule into the adapter and/or a controlled pull out force required to remove the ferrule from the adapter. In at least some preferred embodiments of the present invention, the pull out force is controlled so that: (i) a human installer can remove the ferrule by hand; but (ii) the ferrule will not pull out from forces that are typically inadvertently applied to the fiber optic line in typical use environments.

The resistance to inserting and removing the ferrule comes from a spring, or spring, with spring being defined broadly as any object that can be elastically and resiliently deformed. In a highly preferred embodiments of the present invention the spring (or springs) are toroid shaped coil spring(s).

The present invention recognizes a new problem with conventional ferrules and conventional adapters in conventional lightboxes. The problem is that the ferrule (and its associated fiber optic cable and/or light source and/or light destination) may be optically mismatched with the mating adapter (and its associated lightbox and/or the light source and light destination). For example, if the ferrule supplies a high wattage fiber optic "signal" (the word signal should not be taken to imply that any data is encoded into the electromagnetic energy being transmitted) and the lightbox was designed to receive and apply a low wattage signal, then the energy delivered through the ferrule could damage equipment, or even medical patients.

According to an aspect of the present invention, certain mating dimensions of the ferrule and of the adapter are chosen based upon some characteristic of the fiber optic signal that the ferrule and adapter are designed to communicate. For example, an outer profile shape of the ferrule and interior profile shape of the adapter could be chosen as follows: (i) triangular for a 5 watt signal; (ii) square for a 10 watt signal; and (iii) pentagonal for a 15 watt signal. As a further example, the outer profile diameter could be adjusted based on intended wattage, so that the outer diameter of a ridge around the outside of the ferrule intended for some pre-determined wavelength fiber optic signal will: (i) not fit into adapters that are too small because they are not intended for that wavelength; (ii) not stay securely within adapters that are too large because they are not intended for that wavelength; and (iii) fit and remain securely in only adapters present in lightboxes that are intended for the correct wavelength fiber optic signal. the point is that the geometry of the ferrule and adapter is based upon some characteristic(s) of the fiber optic signal that the equipment is designed to handle and employ.

According to a further aspect of the present invention, an assembly is for use with a fiber optic cable. The assembly includes: a ferrule (that defines an axial direction, an angular direction and a radial direction); an adapter; a ridge; and a spring. The ferrule defines an interior space running along the axial direction. The interior space of the ferrule is sized, shaped and/or located so that it can accommodate the fiber optic cable. The adapter defines an interior space running through the adapter in the axial direction. The interior space of the adapter is sized, shaped and/or located so that it can accommodate the ferrule. The spring is sized, shaped and/or located so that in is between the ferrule and the adapter in the radial direction when the ferrule is inserted into the adapter. The ferrule, the adapter and the spring are sized, shaped structured and/or located so that: (i) when the ferrule is inserted into the interior space of the adapter in the axial direction, physical interference between the spring and the ridge will cause the spring to temporarily elastically deform in the radial outwards direction, as the spring and ridge relatively move past each other in the axial direction, to provide some level of resistance to the insertion; and (ii) when the ferrule is removed from the interior space of the adapter in the axial direction, physical interference between the spring and the ridge will cause the spring to temporarily elastically deform in the radial outwards direction, as the spring and ridge relatively move past each other in the axial direction, to provide some level of resistance to the removal.

DESCRIPTION OF THE DRAWING(S)

The present invention will be more fully understood and appreciated by reading the following Detailed Description in conjunction with the accompanying drawings, in which:

FIG. 1A is an orthographic front view of a first embodiment of a ferrule/adapter assembly according to the present invention;

FIG. 1B is an cross-sectional side view (some cross-hatching omitted for clarity of illustration) of the first embodiment assembly;

FIG. 1C is an orthographic rear view of the first embodiment assembly;

FIG. 2A is an orthographic front view of a ferrule that is part of the first embodiment assembly;

FIG. 2B is an cross-sectional side view (some cross-hatching omitted for clarity of illustration) of the ferrule of the first embodiment assembly;

FIG. 2C is an orthographic rear view of the ferrule of the first embodiment assembly;

FIG. 5A is an orthographic front view of a spring that can be used in the present invention; and FIG. 5B is an orthographic side view of the spring of FIG. 5A.

DETAILED DESCRIPTION OF THE INVENTION

Figure 3C:
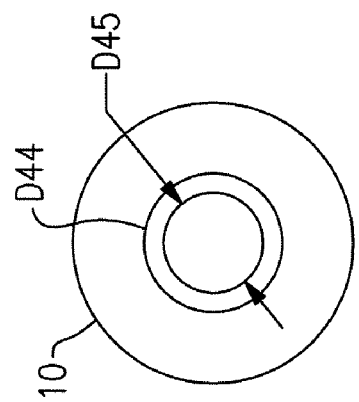
FIG. 3C is an orthographic rear view of the adapter of the first embodiment assembly.

FIGS. 1 to 4 show various views of a fiber optic coupling assembly 100 according to the present invention. Assembly 100 includes: adapter device 10; multiple-fiber fiber optic cable 12; ferrule 14; stop surface 20; elastic spring 22 (including aperture 22a defined therein); ridge portion (or simply ridge) 24; and grooves 26, 28.

As seen in FIG. 1, ferrule 14 terminates cable 12 and allows it to be coupled with adapter device 10 (attached to a light box) so that the cable is in fiber optic communication with optics inside of the light box (light box and optics inside of the light box are conventional and not shown). The mechanical and fiber optic communication connections between the cable/ferrule and the adapter/lightbox are detachably attachable as will be explained in further detail below. To put it more simply, the present invention allows the ferrule to be plugged into and removed from the adapter in the lightbox so that there is fiber optic communication between the cable and the lightbox when the cable/ferrule is plugged into the adapter. In the views of FIGS. 1A, 1B and 1C, ferrule 14 is fully plugged into adapter 10.

Shown in FIGS. 1 and 2, cable 12 can be any kind of fiber optic cable now known or to be developed in the future, including, but not necessarily limited to, cables having fiber(s) for visible light, infrared radiation, ultraviolet radiation, or a combination of these types. Cable 12 can be of varying size, length, shape and/or number of fibers (including only a single fiber). For clarity of illustration, in the views of FIGS. 1 and 2, individual fiber optic fibers are not separately shown. The fiber optic cable and ferrule can be either disposable or reusable depending on the requirements and equipment of the user. As shown in FIG. 2, ferrule 14 can take on many various shapes, but it should: (i) have outer diameters so that in can be plugged into adapter 10; (ii) have an appropriately located, sized and shaped stop surface 20 in order control axial direction A position of the ferrule with respect to the adapter when the ferrule is plugged in with requisite precision to allow fiber optic communication; and (iii) has appropriate circumferential profiles to allow engagement with spring 22 (as will be explained further below). The ferrule can be composed of any suitable material now known, or to be developed in the future, including but not limited to, plastic or metal.

Adapter 10 comprises two springs 22 which are used to restrain ferrule 14 inside the adapter. When ferrule 14 is pushed into the cavity 28 defined in adapter 10 (shown in FIG. 3), ridge 24 of the ferrule forces compression of spring 22 away from its at-rest position, against its bias. Once the ridge has sufficiently compressed the springs to allow the ridge of the ferrule to be further inserted inside cavity 28, the spring 22 will return toward its at-rest position inside of the interior space created by the axial alignment of circumferential groove 26 defined in the ferrule (see FIG. 2B) and circumferential groove 28 defined in the interior space of the adapter (see FIG. 3B). Once returned to its at-rest position (or something close to its at-rest position), spring 22 blocks the ferrule from being unplugged unless sufficient axial direction force is applied such that ridge 24 of the ferrule again compresses the spring in the radial outwards direction so that the ridge can pass through the aperture 22a defined in spring 22. In this way, the mechanical and fiber optic communication connections between the ferrule and adapter are detachably attachable (as opposed to permanent), but they are not too easily detachably attachable.

In the preferred embodiment of assembly 100, the outer profiles of the ferrule (for example the profile of groove 26) are circular, the interior space defining profiles of the adapter (for example, the profile of groove 28) are circular and the spring is circular. This means that ferrule can be inserted in the adapter at any angular orientation (angular direction C is shown in FIG. 1A). In other embodiments, these profiles may take on other shapes, and that may even be preferred if angular direction alignment of the fiber optic communication path(s) are critical for some reason.

The geometry of ridge 24 can be modified to further control the force needed to insert or remove the ridge on the ferrule axially past spring 22. Increasing the diameter of the ridge will generally increase the amount of force required to insert or remove the ferrule, while decreasing the diameter of the ridge will generally decrease the amount of required force. The characteristics of the spring may also be changed. As a further alternative, multiple springs could be used, such as multiple elastic members or leaf springs spaced apart in the angular direction around the circumference of groove 28 in the adapter.

Although FIG. 2 describes fiber optic cable 12 and ferrule 14 with specific dimensions, these are only used to depict a preferred embodiment and do not limit the scope of the present invention. Similarly, while FIG. 2 shows the dimensions of the proximal end 18 and the distal end 20 of the ferrule, the dimensions are only used to depict a preferred embodiment and do not limit the scope of the present invention. In preferred embodiment 100, the preferred dimensions, with reference to FIGS. 2A, 2B, 2C, 3A, 3B and 3C are as follows (dimensions in inches unless otherwise indicated): D1=0.340+/0.002; D4=0.585; D5=0.639; D6=0.2410; D8=0.212; D9=0.135; D10=27 degrees; D11=20 degrees; D12=0.660; D13=30 degree chamfer; D14=0.158 diameter; D16=0.218; D30=0.35 diameter; D31=0.530 to theoretical sharp corner; D32=0.625; D33=135 degrees; D34=0.307; D35=½"-20 UNF 2B; D36=0.040 RAD; D37=0.135; D38=0.192; D39=0.642; D40=0.335; D41=0.257; D42=0.062; D43=0.350; D44=0.298 diameter; and D45=0.220 diameter.

One key aspect of some embodiments of the present invention is that many, if not most, if not all, of the dimensions for the ferrule and/or adapter described in the previous paragraph were designed by the designed for equipment having a fiber optic signal that has at least one specific characteristic in mind. For example, in this exemplary embodiment, the dimensions were chosen based on an intended signal of 9.00 to 11.00 watts. Other ferrules would not fit into the adapter of FIG. 3 because these ferrules would not have the critical dimensions shown in FIG. 2. Other adapters would not allow the ferrule of FIG. 2 to be plugged into their lightbox because these adapters would not have the critical dimensions shown in FIG. 3. Other critical dimensions could be used, so long as the designer designs both the ferrules and the adapters to have dimensions that: (i) mate up; and (ii) are instructed to be used only with fiber optic signals having the correct characteristic (or characteristics). In the geometry of the coupling embodiment of FIGS. 2 and 3, especially critical dimensions are D1 (the outer diameter of ridge 24, D30 (the inner diameter of the opening in the adapter through which ridge 24 must pass); D12 (the axial length from the end of the ferrule to stop surface 20); and D39 (the corresponding axial length in the adapter interior space).

Other mating geometrical characteristics could be used. As mentioned above, different shapes could be used to convey different fiber optic signal characteristics. As a further example, there could be a threaded mating, with the thread characteristics used make sure only intended ferrules and adapters were mated with each other. Other fiber optic signal characteristic(s) could be controlled. Power is generally an important one, by other characteristics such as wavelength (of the light or radiation), frequency (of a time varying signal), number of fibers, and so on could be controlled by controlling the geometry of the ferrule and the mating geometry of the adapter. the fiber optic characteristic that is to be controlled could be controlled to be some precise quantity, or quality, or it could be a range. The controlled characteristic(s) should reflect which characteristics are functionally important to the equipment and/or medical patients upstream and/or downstream of the ferrule/adapter coupling.

Figure 3B:
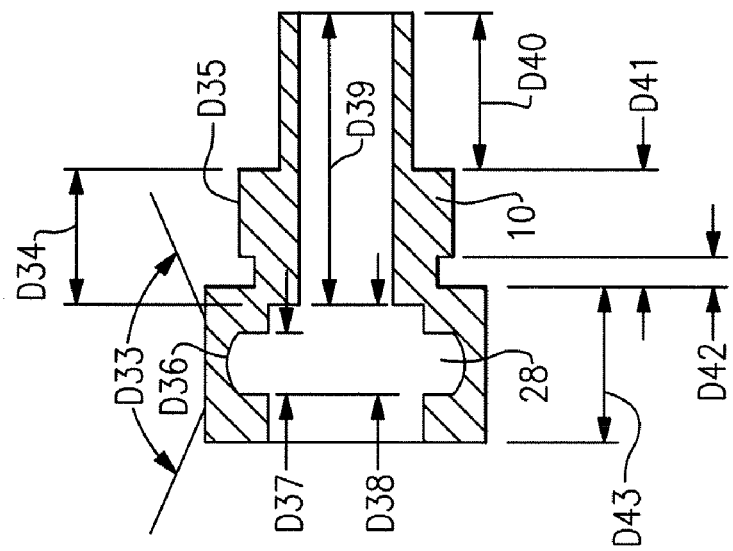
FIG. 3B is an cross-sectional side view (some cross-hatching omitted for clarity of illustration) of the adapter of the first embodiment assembly.
Figure 3A:
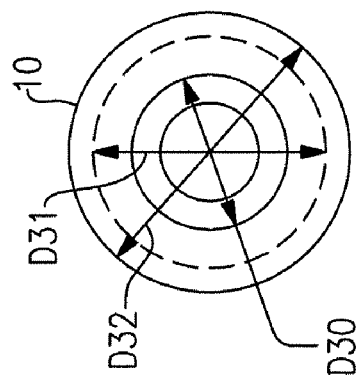
FIG. 3A is an orthographic front view of a adapter device (or sometimes simply device or sometimes simply adapter) of the first embodiment assembly.

Referring now to FIGS. 3A to 3C, adapter 10 has defined therein an interior space that includes groove 28. This interior is designed to comfortably, yet snugly, receive ferrule 14 in both length and circumference. The exterior of the adapter comprises a structure that allows interaction with a receiving surface or cavity of a light source (not shown). In a preferred embodiment, the exterior surface of the adapter which interacts with the light source is threaded with the dimensions of ½" by 20 to allow a strong but reversible engagement with the light source. Alternatively, the adapter can be structured for permanent attachment to the light source using any method or device for permanent attachment known in the art. When adapter 10 is tightly anchored to the light source, ferrule 14 can be forcefully inserted and removed without causing the removal of the adapter. It should be kept in mind that the adapter and ferrule engagement of the present invention could be used in other types of larger assemblies that do not include a lightbox. For example, the adapter could be in the form of a connector the is attached at the free end of a fiber optic cable.

Figure 4C:
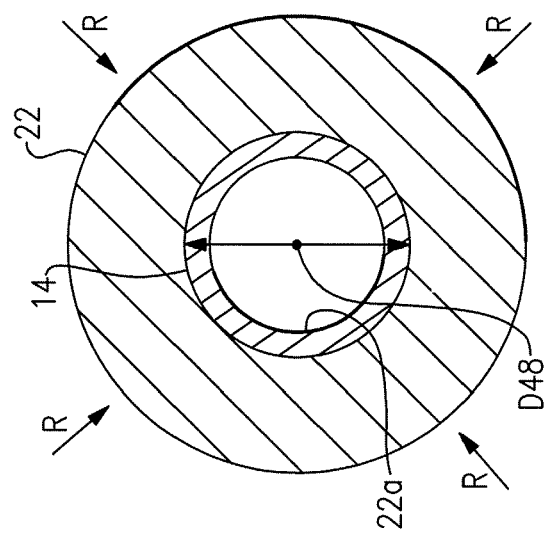
FIG. 4C is a cross-sectional view of the elastic spring after the ferrule termination member is fully inserted so that the ridge portion has moved completely through the opening in the spring.
Figure 4B:
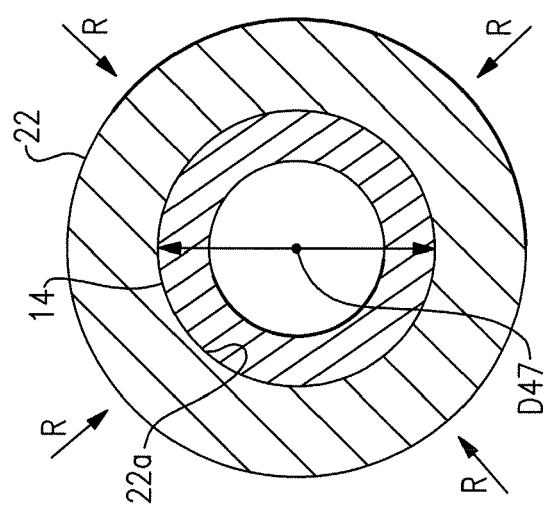
FIG. 4B is a cross-sectional view of the elastic spring as a ridge portion of the ferrule is being inserted through an opening in the spring.
Figure 4A:
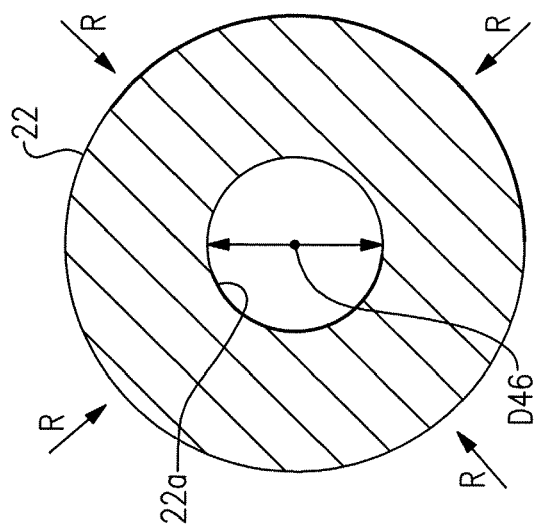
FIG. 4A is a cross-sectional view of an elastic spring within the interior space of an adapter prior to insertion of the ferrule.

Referring now to FIGS. 4A to 4C, cross-sectional views are shown to show the elastic deformation of spring 22 as ferrule 14 is inserted into its aperture 22a. FIG. 4A shows an axial plane cross section of the spring prior to insertion of the ferrule, so that the spring is at its at-rest position. In this state, aperture 22a has a relatively small diameter D46. FIG. 4B shows ferrule 14 being inserted, and more specifically the state of spring 22 when the ridge of the ferrule and the spring are axial alignment on their way past one another in the axial direction. Note that the physical interference with the ridge has elastically deformed the spring so that its aperture is expanded in the radial outwards direction counter-R to relatively large diameter D47. It is this elastic deformation and expansion that provides some level of resistance to the insertion of the ferrule, although it is a level of resistance that can preferably be overcome by a human assembler without too much effort. FIG. 4C shows the spring after the ferrule has been fully inserted into the adapter. Note that a portion of ferrule 14 still extends through the aperture, but it is groove 26 and not ridge 24 that is present in the aperture. In this embodiment, the spring is not allowed to relax all the way back to its at-rest position, but it does relax so that aperture 22a retracts back in the radial inwards direction R, back to an intermediate diameter of D48. In other embodiments, the ferrule (for example, the groove of the ferrule if it has a groove) may be sized and shaped so that the spring is allowed to retract all the way back to its at-rest position.

In embodiment 100, the spring 22 was a solid ring, or annulus, that could be elastically and resiliently deformed and therefore act as a spring. However, in more preferred embodiments of the present invention, the spring is a toroidal coil spring 122 as shown in FIGS. 5A and 5B. The use of a toroidal coil spring is believed to facilitate designs with the correct amount of resistance to insertion and removal of the ferrule and/or to provide good "feel" for the user when plugging and unplugging ferrules from adapters. Instead of a continuous 360 degree toroid shaped spring goes, multiple spring segments could be placed at spaced apart angular intervals.

As a further variation on the present invention, the spring could be built into the ferrule piece (that is the plug piece) and not the adapter piece. For example, the ferrule could include an elastic ring about its circumference that acts as the spring, with the ridge being built into the adapter to protrude in a radial inwards direction into the interior space of the adapter. As a further variation, both the ferrule and the adapter could include both ridges and springs.

As a further variation on the present invention, the ridge and spring may not extend all the way around the angular direction (see FIG. 1A at angular direction C, so that: (i) in certain angular orientations there is spring and ridge engagement as described above; but (ii) when the ferrule and adapter are twisted to another angular orientation the spring and ridge are out of angular alignment so that the ferrule and adapter can be freely engaged and disengaged without compression on the spring. In this embodiment, the ferrule and/or adapter would be twisted to "lock" and "unlock" the assembly for easier assembly and disassembly, but even in the "locked" position the ferrule and adapter could still be pushed into engagement and/or pulled apart so long as the requisite amount of axial direction force is applied. This embodiment may be preferred in embodiments where: (i) the ferrule and adapter should stay engaged even when relatively small axial forces are applied (for example, normal expected operation axial stresses and strains); but (ii) the ferrule and adapter should disconnect if a large axial force is applied (for example, a force large enough to damage the cable, ferrule and/or adapter). In this way, the spring and ridge engagement can be designed to be somewhat tighter because human users will be instructed to deliberately twist and push, or deliberately twist and pull, so that they do not need to struggle with the relatively strong engagement force.

As a further variation on the present invention, both the spring and the ridge may be elastic and resilient, so that both the spring and ridge elastically deform as they move past each other in the axial direction. In fact, the spring and ridge may be equally elastic and resilient, such that either portion of the assembly could be denominated as "spring" or "ridge." As a further variation on the present invention, although the preferred embodiments of the present invention are ferrules and adapters for fiber optic cable, the present invention may be advantageously applicable to other types of cables, such as: electrical cables; flexible fluid tubing; solid, flexible mechanical tethering cables; grounding straps; and so on.

Although the present invention has been described in connection with a preferred embodiment, it should be understood that modifications, alterations, and additions can be made to the invention without departing from the scope of the invention as defined by the claims.

What is claimed is:

1. An assembly for use with a cable, the assembly comprising:
    a ferrule that defines an axial direction, an angular direction and a radial direction;
    an adapter;
    a ridge; and
    a spring;
    wherein:
    the ferrule defines an interior space running along the axial direction;
    the interior space of the ferrule is sized, shaped and/or located so that it can accommodate the cable;
    the adapter defines an interior space running through the adapter in the axial direction;
    the interior space of the adapter is sized, shaped and/or located so that it can accommodate the ferrule;
    the spring is sized, shaped and/or located so that in is between the ferrule and the adapter in the radial direction when the ferrule is inserted into the adapter;
    the ferrule, the adapter and the spring are sized, shaped structured and/or located so that: (i) when the ferrule is inserted into the interior space of the adapter in the axial direction, physical interference between the spring and the ridge will cause the spring to temporarily elastically deform in the radial outwards direction, as the spring and ridge relatively move past each other in the axial direction, to provide some level of resistance to the insertion; and (ii) when the ferrule is removed from the interior space of the adapter in the axial direction, physical interference between the spring and the ridge will cause the spring to temporarily elastically deform in the radial outwards direction, as the spring and ridge relatively move past each other in the axial direction, to provide some level of resistance to the removal.

2. The assembly of claim 1 wherein the cable is a fiber optic cable.

3. The assembly of claim 2 wherein the ridge is built into the ferrule.

4. The assembly of claim 2 wherein the ridge is built into the adapter.

5. The assembly of claim 2 wherein the spring is a toroidal coil spring.

6. A method of designing a ferrule and an adapter to communicate a fiber optic signal having at least one predetermined characteristic through a ferrule/adapter coupling, the method comprising the steps (not necessarily in the following order) of:
    (a) shaping and dimensioning an outer surface of a signal-specific ferrule;
    (b) shaping and dimensioning an inner surface of a signal-specific; and
    (c) instructing users of the signal-specific ferrule and/or the signal-specific adapter to only use it in conjunction with fiber optic signals that have the at least one predetermined characteristic;
    wherein:
    the shaping and dimensioning performed at steps (a) and (b) are performed so that the signal-specific ferrule and the signal-specific adapter will reliably engage and disengage;

the shaping and dimensioning performed at steps (a) and (b) are performed so that the signal-specific ferrule and will not reliably engage with adapters other than the signal-specific adapter; and the shaping and dimensioning performed at steps (a) and (b) are performed so that the signal-specific adapter and will not reliably engage with ferrules other than the signal-specific ferrule.

7. The method of claim 6 wherein step (a) is performed, at least in part, by copying critical shapes and/or dimensions from a pre-existing signal-specific ferrule.

8. The method of claim 6 wherein step (b) is performed, at least in part, by copying critical shapes and/or dimensions from a pre-existing signal-specific adapter.

9. A ferrule made according to the method of claim 6.

10. The method of claim 9 wherein:
step (a) is performed so that the signal-specific ferrule has a ridge of a predetermined outer diameter dimension and shape;
step (b) is performed so that the signal-specific adapter has a spring of a predetermined, at-rest inner diameter and shape; and
the ridge and spring are dimensioned and shaped so that the spring will provide some level of resistance to plugging in and removing the ferule from the adapter.

11. An adapter made according to the method of claim 6.

12. The method of claim 6 wherein the predetermined characteristic is a predetermined range of power levels for the fiber optic signal.

13. The method of claim 6 wherein the predetermined characteristic is a predetermined power levels for the fiber optic signal.

* * * * *